Figure 1:
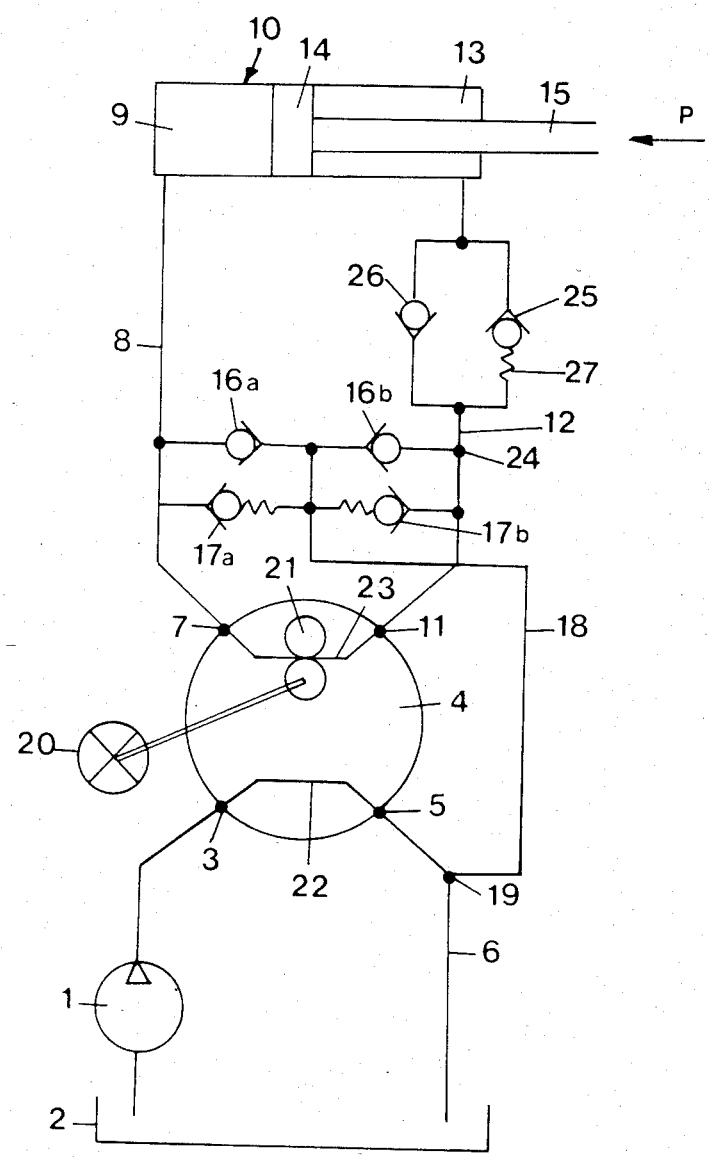

United States Patent [19]
von Huth Smith

[11] Patent Number: 4,505,110
[45] Date of Patent: Mar. 19, 1985

[54] HYDROSTATIC STEERING SYSTEM

[75] Inventor: Ulf M. von Huth Smith, Nordborg, Denmark

[73] Assignee: Danfoss A/S, Nordborg, Denmark

[21] Appl. No.: 405,192

[22] Filed: Aug. 4, 1982

[30] Foreign Application Priority Data

Aug. 10, 1981 [DE] Fed. Rep. of Germany ....... 3131619
Aug. 31, 1981 [DE] Fed. Rep. of Germany ....... 3134341

[51] Int. Cl.³ .................... B62D 5/08; F15B 13/042
[52] U.S. Cl. ........................................ 60/384; 60/386; 91/443; 180/132
[58] Field of Search .............. 60/384, 386, 385; 91/443, 463, 464, 434, 437, 441; 180/132; 137/625.24

[56] References Cited
U.S. PATENT DOCUMENTS 3,926,210 12/1975 Rasmussen ................ 91/451 X
4,372,413 2/1983 Petersen et al. ............ 60/384 X
4,432,270 2/1984 Kyster et al. ............... 60/384 X

FOREIGN PATENT DOCUMENTS 598406 6/1934 Fed. Rep. of Germany ........ 91/443
2048421 4/1972 Fed. Rep. of Germany ...... 180/132
1303280 1/1973 United Kingdom ................ 180/132

OTHER PUBLICATIONS

Danfoss Catalog, "Fully Hydraulic Steering Units and Accessories", 1976.

Primary Examiner—Irwin C. Cohen
Attorney, Agent, or Firm—Wayne B. Easton

[57] ABSTRACT

The invention relates to a reaction or open center type hydraulic steering control system which is adapted for use with a bidirection differential type servomotor having a piston rod extending from only one side thereof. A loaded check valve in a selected one of the lines to the servomotor compensates for relatively low above atmospheric pressures sometimes present in the line leading from the open center passage of the control unit to the exhaust tank when the control unit is in a neutral position.

4 Claims, 2 Drawing Figures

HYDROSTATIC STEERING SYSTEM

The invention relates to a hydrostatic steering system having a servomotor comprising a differential piston, a control mechanism provided with a steering element and measuring device for the operating fluid, and having two motor lines leading from the control mechanism to the servomotor, each connected via a suction check valve with a line leading to the container.

In a known hydrostatic steering system of this kind (DE-PS No. 23 18 962), the motor lines in the control mechanism are shut off in the neutral position of the latter. When external forces act on the servomotor, the measuring device and the steering wheel are not influenced thereby. Any overpressure building up is reduced through spring-loaded overpressure valves connected antiparallel to the suction check valves.

Further, control mechanisms are known (Danfoss steering unit OSPB OR) where the motor lines are connected together through the measuring device in the neutral position of the control mechanism. When external forces act on the servomotor, there results a displacement of the measuring device which is transmitted to the steering element as rotational movement, so that the operator can counteract. Such a control mechanism is referred to also as "reaction type." Heretofore, however, it has not been possible to use such a control mechanism in connection with a servomotor which has a differential piston. The reason was that in the neutral position of the control mechanism sometimes uncontrollable movements of the servomotor occur, even when no external forces act on it.

It is the object of the invention to indicate a hydrostatic steering system of the above described kind where a servomotor with differential piston and a control mechanism of the "reaction type" cooperate without uncontrolled movements of the servomotor occurring.

This problem is solved according to the invention in that, in a manner known in itself, the two motor connections are connected together through the measuring device in the neutral position of the control mechanism, and that in the section of the motor line located between the servomotor and the connection of the suction check valve antiparallel-connected mainstream check valves are arranged, of which the one whose opening direction corresponds to a pressure medium flow in the neutral position from the chamber of smaller pressure surface of the servomotor via the control mechanism to the chamber of larger pressure surface is loaded in such a way that it opens only after a limit value of the pressure difference prevailing at it is exceeded.

If the antiparallel-connected mainstream check valves are arranged in the motor line assigned to the smaller pressure surface of the differential piston, the loaded mainstream check valve should open toward the control mechanism. If the antiparallel-connected mainstream check valves are arranged in the motor line assigned to the larger pressure surface of the differential piston, the loaded mainstream check valve should open away from the control mechanism. It is possible also, however, to provide such antiparallel-connected mainstream checkvalves in both motor lines.

The invention is based on the finding that the junction point of the suctioncheck valves to the line leading to the container does not always have atmospheric pressure, but frequently the pressure is somewhat higher. This is true in particular for a control mechanism where in the neutral position the pump connection is coupled with the container connection, that is, a control mechanism of the "open center type" is used, because then the pressure drops in the line leading to the container are not negligible. But the pressure at the junction acts via the suctioncheck valves on the two motor lines. Since in a differential piston one pressure surface is larger than the other, the piston receives an uncontrolled drive movement.

This movement is prevented by the use of the loaded mainstream check valve. In fact, this valve opens only after a certain pressure difference prevails at it. As the pressures in the line leading to the container do not reach high values, relatively low limit values of the pressure difference are sufficient, for example about 3 bar. This pressure difference is of no great importance in normal operation.

In the simplest case, the closure piece of the mainstream check valve opening toward the control mechanism is loaded by a pre-tensioned spring.

The other mainstream check valve permits in normal operation the inflow of pressure fluid to the pressure chamber associated with the smaller pressure surface of the differential piston. This valve needs to be slightly loaded at most.

The invention is explained more specifically below with reference to preferred embodiments illustrated in the drawing, in which:

FIG. 1 shows schematically a steering system according to the invention and

Figure 2:
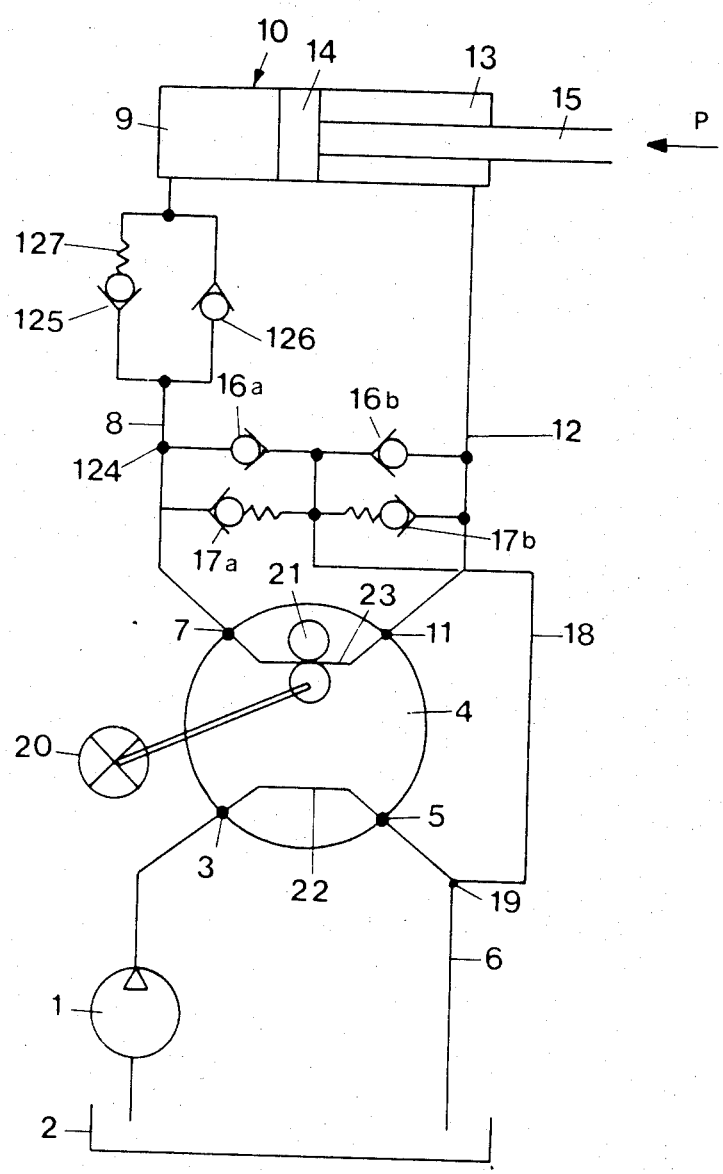

FIG. 2 another form of realization of the invention.

According to FIG. 1, a pump 1 delivers from a container 2 pressure fluid to a pump connection 3 of a control mechanism 4. A tank connection 5 is connected with container 2 via a line 6. A motor connection 7 communicates via a motor line 8 with a pressure chamber 9 of a servomotor 10, and a motor connection 11 via a motor line 12 with the other pressure chamber 13 of the servomotor. The latter comprises a differential piston 14 which via its piston rod 15 displaces an element to be steered, e.g. the wheels of a vehicle. The two motor lines 8 and 12 are connected via a suctioncheck valve 16a, 16b for each and a line section 18 with a point 19 in the line 6 leading to container 2. Antiparallel to these suction check valves, overpressure valve 17a and 17b are connected. The control mechanism 4 comprises a steering element 20, for example a steering wheel. Also a measuring device 21 is provided, for example a measuring motor. The steering element and measuring motor act on a valve arrangement which comprises for example two rotary slide valve sleeves, one of which is displaced by the steering element 20 and the other is made to follow by the measuring device 21. In addition, the steering element 20 and measuring device 21 are connected together with interposition of a spring and—after a given lost motion—through a mechanical stop. The valve arrangement brings it about that upon displacement to one side pressure fluid flows from pump 1 via the measuring device 21 to the motor line 8, while low-pressure fluid is discharged via motor line 12 to the container 2. Upon change of direction of rotation, pressure fluid passes from pump 1 via the measuring device 21 to the motor line 12, while low-pressure fluid is discharged via motor line 8 to container 2. In the illustrated neutral position of the valve arrangement, the pump connection 3 and container connection 5 are connected together via a shortcircuit path 22, thereby permitting a so-called "open center" operation, at which the pump pressure is maintained relatively low. The two motor connections 7 and 11 are connected together via a connecting line 23 leading via the measuring device 21, so that external forces P acting on piston 14 transfer pressure fluid from one pressure chamber 9 into the other pressure chamber 13, this pressure fluid running over the measuring device 21 and in so doing exerting a moment on the steering element 20. Excess fluid is discharged via the overpressure valve 17a to the container. The same applies to external forces in the opposite direction, except that for filling up the pressure chamber 9 pressure fluid is sucked in through the suction-check valve 16a.

In the motor line 12, in the section between the servomotor 10 and the junction point 24 of the suctioncheck valves 16a and 16b, two antiparallel-connected mainstream check valves 25 and 26 are also provided. The mainstream check valve 25 opening toward the control mechanism 4 is loaded by a spring 27 in such a way that it opens only after a limit value of the pressure difference prevailing at it of about 3 bar is exceeded. The other mainstream check valve 26 is not loaded at all.

The function of these mainstream check valves 25 and 26 is the following: If at point 19 a pressure prevails which is somewhat above atmospheric pressure, this pressure acts via check valve 16a on the pressure chamber 9 and via the check valves 16b and 26 on the pressure chamber 13. Because of the different surfaces of the differential piston, there results a force which strives to push piston 14 to the right. This displacement, however, is not possible as long as the limit value of the differential pressure at the mainstream check valve 25 is not exceeded. As the pressure at point 19 cannot assume high values, relatively weak loading spring 27 are sufficient. Hence servomotor 10 maintains its position in the neutral position of control mechanism 4. In normal operation, the inflow to pressure chamber 9 via motor line 8 is unimpeded. The flow in motor line 12 toward the servomotor 10 is likewise unimpeded, as check valve 26 is unloaded. Flow in the opposite direction does require overcoming of the loading spring 27. But since the latter may be weak, no appreciable impediment is observable either.

In the form of realization according to FIG. 2, two antiparallel-connected mainstream check valves 125 and 126 are provided in the motor line in the section between servomotor 10 and junction point 124 of the suctioncheck valve 16a. The mainstream check valve 125 opening away from the control mechanism 4 is loaded by a spring 127, while the other mainstream check valve 126 is not loaded.

The function of this arrangement is the following: When a pressure prevails at point 19 which is somewhat above atmospheric pressure, this pressure does indeed act via check valve 16b on the pressure chamber 13, but it is unable to displace any fluid into the pressure chamber 9, because the loaded mainstream check valve 125 prevents this. Consequently the differential piston 14 stands still. For the rest, the explanations for FIG. 1 apply.

For all parts shown schematically commercial devices can be used. It is desirable in particular to combine several valves in one block, specifically valves 25 and 26, or respectively 125 and 126, in one block with the valves 16a, 16b, 17a and 17b. All these valves may be arranged in the housing of the control mechanism 4.

I claim:

1. A hydraulic steering control system comprising, a bidirectional differential type servomotor having a piston with a rod extending from only one side thereof and rod side and non-rod side operating ports on opposite sides thereof, pump and tank means, manually operable steering control means, a metering control unit having a housing, metering motor means in said housing controlled by said steering control means, said housing having a supply port connected to said pump means and an exhaust port connected to said tank means, said control unit being of the reaction type and having a neutral position wherein pressure fluid is bypassed from said pump means to said tank means, said housing having first and second control ports, means connecting said control ports respectively to said rod and non-rod side servomotor operating ports, first and second check valve means having output sides respectively connected to and being openable towards said servomotor operating ports and having input sides connected to and in open communication with said housing exhaust port and tank means, flow path means corresponding to a neutral position of said steering control means, said flow path means providing a reaction mode by connecting said servomotor ports to each other via said housing control ports and said metering motor means, antiparallel check valve means in said flow path means including two check valves, one of said check valves including loading means to allow opening thereof at a predetermined pressure on the order of 3 bar in the same direction as a pressure at said housing exhaust port would otherwise tend to move said piston towards said servomotor rod side port.

2. A hydraulic steering control system according to claim 1 wherein said antiparallel check valve means in said flow path means is connected to said servomotor rod side port.

3. A hydraulic steering control system according to claim 1 wherein said antiparallel check valve means in said fluid flow path means is connected to said servomotor non-rod side port.

4. A hydraulic steering control system according to claim 1 wherein said loading means includes spring means.

* * * * *